United States Patent [19]

Martin Sanchez

[11] 4,197,576
[45] Apr. 8, 1980

[54] ADAPTIVE-PREDICTIVE CONTROL SYSTEM

[76] Inventor: Juan Martin Sanchez, C/Alava, 75, Barcelona, Spain

[21] Appl. No.: 821,600

[22] Filed: Aug. 4, 1977

[30] Foreign Application Priority Data

Aug. 4, 1976 [GB] United Kingdom ............... 32395/76

[51] Int. Cl.$^2$ ....................... G05B 13/02; G06F 15/46
[52] U.S. Cl. .................................... 364/106; 364/121; 364/116; 364/501
[58] Field of Search ............... 364/105, 106, 108, 118, 364/121, 501, 116

[56] References Cited

U.S. PATENT DOCUMENTS

| | | | |
|---|---|---|---|
| 3,601,588 | 8/1971 | Bristol | 364/106 |
| 3,767,900 | 10/1973 | Chao et al. | 364/106 |
| 3,795,799 | 3/1974 | Courtiol | 364/106 |
| 3,876,871 | 4/1975 | Sinner | 364/106 |
| 3,920,965 | 11/1975 | Sohrwardy | 364/106 |

*Primary Examiner*—Joseph F. Ruggiero
*Attorney, Agent, or Firm*—Ostrolenk, Faber, Gerb & Soffen

[57] ABSTRACT

An adaptive-predictive control system for controlling single-input single-output, or multivariable time-variant processes with known or unknown parameters and with or without time delay, is disclosed. The adaptive-predictive control system of the present invention updates on real time the parameters of an adaptive-predictive model from which the dynamic output vector of the process being controlled is predicted and the control vector controlling the operation of this process is computed with the objective that the predicted dynamic output vector becomes equal to the desired dynamic output vector.

12 Claims, 3 Drawing Figures

ADAPTIVE-PREDICTIVE CONTROL SYSTEM

BACKGROUND OF THE INVENTION

The invention is related to an adaptive control system for single-input single-output or multivariable time-variant processes with known or unknown parameters and with or without time delays.

Such a control system is useful in many diverse fields such as aeronautics, electronics, chemical engineering, etc. Examples of processes in which the adaptive-predictive control system has been applied are single-input single-output control of an aircraft where the pitch angle is controlled by elevator position, and the multivariable control of a distillation column where top and bottom compositions are controlled by reflux and steam flow rates.

It is known that the control performance of a system with a control system based on constant parameters deteriorates when the dynamic parameters of the process vary in an unforeseen way which is not capable of direct or indirect measurement. In recent years, control techniques have been developed to try to solve this problem, the most noteworthy of which have been based on the model reference adaptive systems theory, which basically operates in one of the following ways: (1) Performs a real time adaptive estimation of the parameters and state variables of the process, from which an adaptive regulator computes the control to be applied to the process, or (2) Computes the control to be applied to the process through an adaptive control scheme in order to make the process output follow a model reference output. In general, in both of the above cases, the control structure requires the design of a corrector and the difficulties encountered in the computation of the parameters of this corrector as the order of the process increases, severely restricts the field of applications of these techniques.

BRIEF DESCRIPTION OF THE INVENTION

The present invention uses a digital computer to accomplish the adaptive control of single-input single-output or multivariable time-variant processes with known or unknown parameters and with or without time delays, in such a way that the dynamic output vector of the process is predicted and the control vector, to be applied to the process, is computed with the objective that the predicted dynamic output vector becomes equal to the desired dynamic output vector, and this is done at every sampling or control instant by a number of simple and specific operations.

BRIEF DESCRIPTION OF THE DRAWINGS

The implementation of the invention will be described in a general way with reference to the accompanying figures, following this the results of a particular application of the control system will be shown.

DETAILED DESCRIPTION OF THE INVENTION

Figure 1:
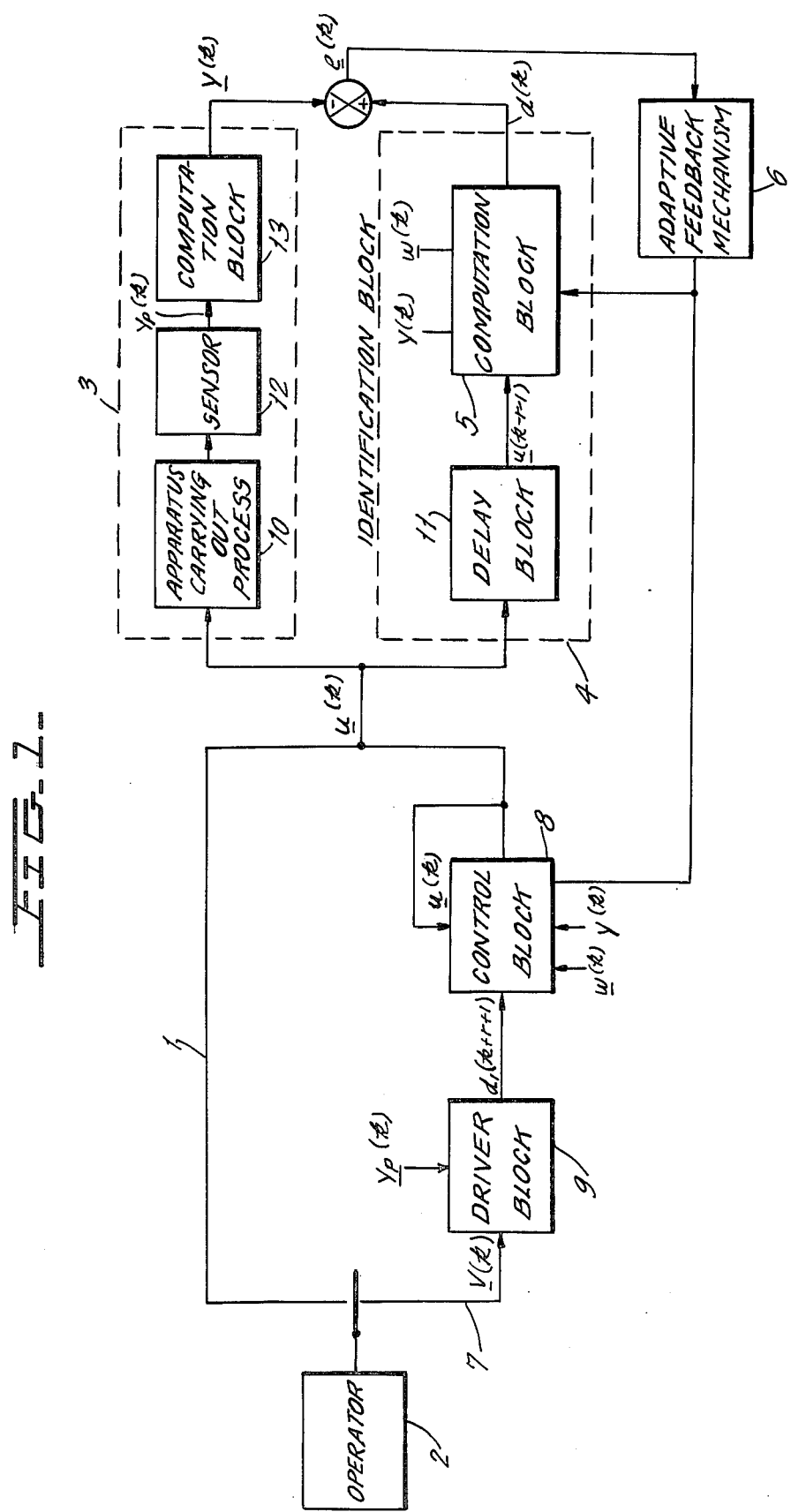
FIG. 1 shows the general and conceptual structure of the adaptive-predictive control system.

At any sampling instant k, two modes of operation of the control system are possible; an identification mode and a control mode. Which mode is employed is determined by either a human or an automatic operator 2. In either case, the modes are as is shown in FIG. 1.

1. Identification mode: In the identification mode, the control vector $\underline{u}(k)$ is directly applied from the operator 2 to the apparatus 10 carrying out the process being controlled and identification block 4 as shown by path 1. The identification block 4 uses an adaptive-predictive model stored in computation block 5 to compute an estimated incremental process output vector $\underline{d}(k)$. An error vector $\underline{e}(k)$ which represents the difference between the actual and estimated incremental process output vectors $\underline{y}(k)$ and $\underline{d}(k)$, respectively, is used to update the parameters of the previously mentioned adaptive-predictive model through an adaptive feedback mechanism 6. The control vector $\underline{u}(k)$ is delayed by r+1 sampling periods in delay block 11 before being acted upon by computation block 5.

2. Control mode: In this mode, the parameters of the adaptive-predictive model are updated as explained above. However, as shown by path 7 the control vector $\underline{u}(k)$ to be applied to the apparatus 10 carrying out the process being controlled is computed by the control block 8, using the same updated adaptive-predictive model as the identification block 4, in such a manner that the desired incremental output vector of the process $\underline{d}_1(k+r+1)$, at the sampling instant k+r+1, will be equal to the predicted incremental process output vector $\underline{d}_1'(k+r+1)$ at the same instant k+r+1, where r is the number of sampling time delays observed or conveniently considered in the process. $\underline{d}_1(k+r+1)$ is computed at the instant k by the driver block 9 in response to the operator 2 input. The input of driver block 9 is set by the operator of the control system and represents the desired set point value of the output of the process. Driver block 9 generates the desired process output trajectory which is the desired dynamic trajectory over which the process output reaches the desired static output. $\underline{d}_1(k+r+1)$ is the value of this trajectory at k+r+1, i.e. the desired process output at instant k+r+1. This value is computed at the instant k by the driver block in response to the operators input $\underline{v}(k)$ as set forth in some detail in the description of the operation (f). As $\underline{u}(k)$ does not act on the process output until the instant k+r+1, the desired output vector of the process $\underline{d}_1(k+r+1)$ at instant k must be known in order to compute $\underline{u}(k)$. r is the number of sampling delays considered on the process.

To properly control the process being carried out by apparatus 10 the adaptive-predictive control system uses incremental values of the output, input and measurable disturbance vectors of the process. Additionally, the control vector can be limit checked. The specific operations that the control system will carry out at every sampling instant k during the control mode are described as follows:

(a) Measurement (by sensor 12), and, if it is considered convenient, filtering of the output variables of the process carried out by apparatus to obtain the process output vector $\underline{y}_p(k)$, the dimension of which is considered to be n.

(b) Computation of the incremental process output vector $\underline{y}(k)$ (in computer block 13) by:

$$\underline{y}(k) = \underline{y}_p(k) - \underline{y}_p(k - \gamma) \tag{1}$$

where $\gamma$ is an integer that can be conveniently chosen and which represents the number of sampling periods upon which the incremental process vector $\underline{y}(k)$ is computed.

(c) Computation in identification block 4 of the estimated incremental process output vector $\underline{d}(k)$ by the adaptive-predictive model, which can be defined by:

$$\underline{d}(k) = \sum_{i=1}^{h} A_i(k-1)\underline{y}(k-i-r_1) + \sum_{i=1}^{f} B_i(k-1)\underline{u}(k-i-r) + \sum_{i=1}^{q} C_i(k-1)\underline{w}(k-i-r_2) \tag{2}$$

Where the vector $\underline{u}(k-i-r)$ and $\underline{w}(k-i-r_2)$ are obtained by:

$$\underline{u}(k-i-r) = \underline{u}_p(k-i-r) - \underline{u}_p(k-i-r-\gamma) \tag{3}$$

$$\underline{w}(k-i-r_2) = \underline{w}_p(k-i-r_2) - \underline{w}_p(k-i-r_2-\gamma) \tag{4}$$

where $\underline{u}_p(k-i-r)$ and $\underline{w}_p(k-i-r_2)$ are the control and the measurable disturbance vector, respectively, of dimensions $n_1$ and m, at the sampling instants $k-i-r$ and $k-i-r_2$, respectively. In equation 2, the integers h, f and g can be conveniently chosen, and likewise the integers $r_1$ and $r_2$ can also be conveniently chosen taking into account the available or forecasted measurements of the output and disturbance vectors, respectively. The matrices $A_i(k-1)$, $B_i(k-1)$ and $C_i(k-1)$ of the adaptive-predictive model have appropriate dimensions and their values correspond to a past value before being updated at the instant k. If the dimension of the control vector is bigger than the dimension of the output vector then, in most of the cases, supplementary conditions should be added to obtain a unique control solution, or simply some of the control vector components can be included in the disturbance vector; as a particular case it will be considered that $n_1 = n$.

(d) Computation of the incremental estimation error vector by:

$$\underline{e}(k) = \underline{y}(k) - \underline{d}(k) \tag{5}$$

(e) Computation in adaptive feedback mechanism 6 of the updated values at instant k of the parameters $a_{ijq}(k)$, $b_{ijq}(k)$ and $c_{ijq}(k)$, that are the elements in the $j^{th}$ row and $q^{th}$ column of the matrices $A_i(k)$, $B_i(k)$ and $C_i(k)$, respectively, by means of the following algorithms:

$$a_{ijq}(k) = \beta_{aijq}\alpha_j(k)e_j(k)y_q(k-i-r_1) + a_{ijq}(k-1) \tag{6}$$

$$b_{ijq}(k) = \beta_{bijq}\alpha_j(k)e_j(k)u_q(k-i-r) + b_{ijq}(k-1) \tag{7}$$

$$c_{ijq}(k) = \beta_{cijq}\alpha_j(k)e_j(k)w_q(k-i-r_2) + c_{ijq}(k-1) \tag{8}$$

where $e_j(k)$, $y_q(k-i-r_1)$, $u_q(k-i-r)$ and $w_q(k-i-r_2)$ are the corresponding components of the vectors $\underline{e}(k)$, $\underline{y}(k-i-r_1)$, $\underline{u}(k-i-r)$ and $\underline{w}(k-i-r_2)$, respectively. $\beta_{aijq}$, $\beta_{bijq}$ and $\beta_{cijq}$ are coefficients that can be conveniently tuned, and $\alpha_j(k)$ ($j=1,n$) are variable gains that can be easily chosen among the wide range of possibilities that the well known gradient parameter identification techniques permit. A particular choice of these variable gains can be the following:

$$\alpha_j(k) = 1/[1 + \sum_{i=1}^{h}\sum_{q=1}^{n} \beta_{aijq}y_q(k-i-r_1)^2 + \sum_{i=1}^{f}\sum_{q=1}^{n} \beta_{bijq}u_q(k-i-r)^2 + \sum_{i=1}^{g}\sum_{q=1}^{m} \beta_{cijq}w_q(k-i-r_2)^2] \tag{9}$$

$(j = 1, n)$ (f) Computation in driver block 9 of the desired incremental output vector $\underline{d}_1(k+r+1)$, which can be carried out, as follows:

1. Computation of the desired process output vector $\underline{d}_p(k+r+1)$ of dimension $(n \times 1)$ which can be done in various ways, such as using a model reference with desired dynamics and also the previously measured or forecasted process outputs. For example, this last type of design can be defined by the following equation:

$$\underline{d}_p(k+r+1) = \sum_{i=1}^{t} F_i\underline{y}_p(k+r+1-r_1-i) + \sum_{i=1}^{s} H_i\underline{v}(k+1-i) \tag{10}$$

Where $\underline{y}_p(k+r+1-r_1-i)$ and $\underline{v}(k+1-i)$ are the process output vector and the driver block input vector at the sampling instant $k+r+1-r_1-i$ and $k+1-i$, respectively. $\underline{v}(k+1-i)$ is a vector of dimension n, that is generated directly by the operator; and the matrices $F_i(i=1,t)$ and $H_j(j=1,s)$, as well as the integers t and s, can be chosen freely to take into account the desired dynamics. An illustration of this choice is given in the Experimental Example below.

2. From the value of the desired output vector of the process $\underline{d}_p(k+r+1)$, the desired incremental output vector $\underline{d}_1(k+r+1)$ can be easily computed in various manners; a particular one, usually convenient when $\gamma > r$, is given by the following equation:

$$\underline{d}_1(k+r+1) = \underline{d}_p(k+r+1) - \underline{y}_p(k+r+1-\gamma) \tag{11}$$

If found necessary the value of $\underline{d}_1(k+r+1)$ can be limit checked.

(g) Computation of the control vector (in control block 8) may be made according to the following:

1. From the updated adaptive-predictive model (updated by the output of adaptive feedback mechanism 6), the predicted incremental process output vector $\underline{d}_1'(k+r+1)$ at the sampling instant $k+r+1$, will depend upon the incremental control vector $\underline{u}(k)$, and is given by the equation:

$$\underline{d}_1'(k+r+1) = \sum_{i=1}^{h} (k)\underline{y}(k+r+1-r_1-i) + \sum_{i=1}^{f} B_i(k)\underline{u}(k+1-i) + \sum_{i=1}^{g} C_i(k)\underline{w}(k+r+1-r_2-1) \tag{12}$$

The incremental control vector $\underline{u}(k)$ is computed by making the predicted incremental process output vector $\underline{d}_1'(k+r+1)$ equal to the desired incremental output $\underline{d}_1(k+r+1)$, and is given by:

$$\underline{u}(k) = B_1^{-1}(k)\underline{d}_1(k+r+1) - B_1^{-1}\sum_{i=2}^{f} B_i(k)\underline{u}(k+1-i) - \tag{13}$$

-continued $$B_1^{-1}(k) \sum_{i=1}^{h} A_i(k)\underline{y}(k + r + 1 - r_1 - i) -$$

$$B_1^{-1}(k) \sum_{i=1}^{q} C_i(k)\underline{w}(k + r + 1 - r_2 - i) \qquad 5$$

2. From $\underline{u}(k)$, the control vector will be computed by:

$$\underline{u}_p(k) = \underline{u}(k) + \underline{u}_p(k-\gamma) \qquad (14)$$

(h) If desired, the control vector $\underline{u}_p(k)$ can be limit checked before being applied to the process.

In its implementation the adaptive-predictive control system can use incremental input, output and disturbance vectors as described in the above operations. An alternative method of implementing the system is to compute the incremental input, output and disturbance vectors with respect to some constant vectors chosen conveniently and, consequently, in the specific equations described above the equation 1, 3, 4, 11 and 14 need to be respectively modified as follows:

$$\underline{y}(k) = \underline{y}_p(k) - \underline{y}_{pc} \qquad (15)$$

$$\underline{u}(k-i-r) = \underline{u}_p(k-i-r) - \underline{u}_{pc} \qquad (16)$$

$$\underline{w}(k-i-r_2) = \underline{w}_p(k-i-r_2) - \underline{w}_{pc} \qquad (17)$$

$$\underline{d}_1(k+r+1) = \underline{d}_p(k+r+1) - \underline{y}_{pc} \qquad (18)$$

$$\underline{u}_p(k) = \underline{u}(k) + \underline{u}_{pc} \qquad (19)$$

Likewise, when it is considered convenient to give specific values to some of the adaptive-predictive model parameters (for instance, because of a certain knowledge of the process), these values can be given to the respective parameters, and the corresponding $\beta$ coefficients will be set to zero. Also it is possible to stop the updating operations of the adaptive-predictive model parameters as long as it is considered convenient.

When the system performs in its identification mode, it only needs to carry out the operations a to e, and this identification action can be performed in real time or off-line, and even in between the sampling intervals.

It will be observed that in the operation g to compute $\underline{u}(k)$, the matrix $B_1(k)$ must be inverted. The risk of singularity of the matrix $B_1(k)$ can almost always be avoided by adding time delays to the components of the input and output process vector, and controlling the resultant process. An illustrative experimental example of this procedure is presented in this patent application.

Another way of implementing the control system is to put the adaptive-predictive model in form that the vector $\underline{d}(k)$ will not be the estimation of the vector $\underline{y}(k)$, but the estimation of any other output or input vector in a previous sampling instant. The error of this estimation will then be used to update the adaptive-predictive model.

In some cases, an equivalent way of applying the control system presented here, is to decompose it to a set of single-output multi-input systems, each one of which will impose a condition to be verified by the components of the control vector at every sampling instant, and from the set of the n corresponding linear equations the control vector can be computed at every sampling instant.

Finally, the static gains of the process can be modified by multiplying the components of its output, input and disturbance vectors or incremental vectors by scalars gain; and also the dynamics of the process can be modified in an analogous way; in this case the control system will control the process through the control of the modified process.

EXPERIMENTAL EXAMPLE: Multivariable control of a binary distillation column

The adaptive-predictive control system, previously described, has been implemented for the multivariable control of top and bottom compositions (in weight % of methanol) of a binary distillation column, at the Chemical Engineering Department, University of Alberta, Edmonton, Alberta (Canada).

Figure 2:
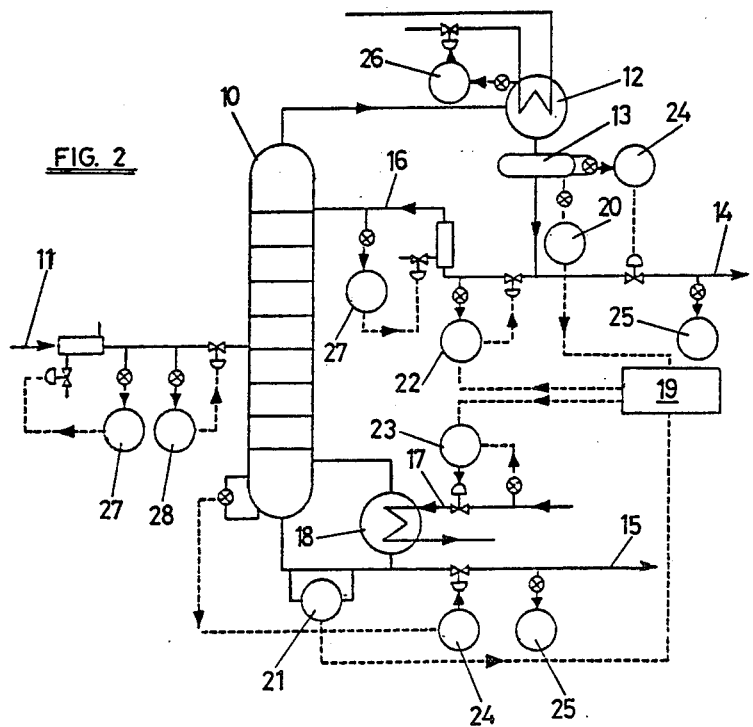
FIG. 2 shows a distillation column on which the adaptive-predictive control system was implemented to carry out a multivariable control of the top and bottom compositions as outputs with reflux and steam flow rates as inputs.

As shown in FIG. 2, the feed flow 11 enters into the distillation column 10 at the fourth ashtray, the top product condensates in 12 by cooling water, and falls to the container 13. The objective of the experiment is to control the composition of the bottom product 15, that goes away from the bottom of the column.

We have used as control variables, the reflux flow rate 16 and the steam flow rate 17, that heats the reboiler 18 in the bottom of the column. To accomplish the experiment we have used a digital computer 19, that takes the measurements of top and bottom compositions made by a composition recorder 20 and a gas chromatography system 21, respectively, and that controls the set point of the flow recorder controllers 22 and 23. In addition, the column had the following equipment: two liquid level indicator controllers 24, two flow recorders 25, a pressure indicator controller 26, two temperature recorder controllers 27 and a flow recorder controller 28.

The control variables were the reflux and the steam flow rates, and the sampling period was of 256 sec. Due to this large sampling period, there is no time delay between top composition and reflux and steam flow rates. There exists a measurement time delay of one sampling period between bottom composition and steam flow rate, because of the analysis time needed to measure the bottom composition, and the time delay between bottom composition and reflux rate was observed to be two sampling intevals. No significant disturbance was acting upon the process.

To avoid the problem of the singularity of $B_1(k)$, previously discussed, a sampling time delay was added to the top composition measurement; consequently, the corresponding component of the process output vector related to the top composition at the sampling instant k, is the measurement of the top composition at instant $k-1$; likewise, this component at instant $k+1$ is already known at instant k.

In accordance with the previously described circumstances, at every sampling instant k, the sequence of operations performed by the adaptive-predictive control system during its control action were:

1. Measurement of top and bottom compositions to obtain the process output vector $\underline{y}_p(k)$, the components of which are the top composition measured at $k-1$, $y_{p1}(k)$, and the bottom composition measured at k, $y_{p2}(k)$.

2. The number of sampling time delays considered for the process r is, in this case, equal to 1, and the integer $\gamma$ was chosen equal to 2; consequently the incremental output vector is computed by:

$$\underline{y}(k) = \underline{y}_p(k) - \underline{y}_p(k-2) \qquad (20)$$

3. In the adaptive-predictive model, the integers h, f and $r_1$ were chosen equal to 3, 4 and 0, respectively, and no disturbance vector was considered; consequently, the estimated incremental output vector $\underline{d}(k)$ was computed by:

$$\begin{bmatrix} d_1(k) \\ d_2(k) \end{bmatrix} = \sum_{i=1}^{3} A_i(k-1) \begin{bmatrix} y_1(k-i) \\ y_2(k-i) \end{bmatrix} + \quad (21)$$

$$\sum_{i=1}^{4} B_i(k-1) \begin{bmatrix} u_1(k-i-1) \\ u_2(k-i-1) \end{bmatrix}$$

where $d_1$ and $y_1$ are the components related to the top composition; and $d_2$ and $y_2$ are the components related to the bottom composition. $u_1$ and $u_2$ are the incremental reflux and steam flow rates respectively. The incremental control vector $u(k-i-1)$ is obtained by:

$$\underline{u}(k-i-1) = \underline{u}_p(k-i-1) - \underline{u}_p(k-i-3) \quad (22)$$

where $\underline{u}_p(k-i-1)$ is the control vector applied at instant $k-i-1$. The matrices $A_i(k-1)$ ($i=1, 3$) and $B_i(k-1)$ ($i=1, 4$) were chosen being:

$$A_1(k-1) = \begin{bmatrix} a_{111}(k-1) & 0 \\ 0 & 0 \end{bmatrix}; A_2(k-1) =$$

$$\begin{bmatrix} a_{211}(k-1) & 0 \\ 0 & a_{222}(k-1) \end{bmatrix}; A_3(k-1) =$$

$$\begin{bmatrix} 0 & 0 \\ 0 & a_{322}(k-1) \end{bmatrix}$$

$$B_1(k-1) = \begin{bmatrix} b_{111}(k-1) & b_{122}(k-1) \\ 0 & b_{122}(k-1) \end{bmatrix}; B_2(k-1) =$$

$$\begin{bmatrix} b_{211}(k-1) & b_{212}(k-1) \\ b_{221}(k-1) & b_{222}(k-1) \end{bmatrix} B_3(k-1) =$$

$$B_4(k-1) = \begin{bmatrix} 0 & 0 \\ b_{421}(k-1) & 0 \end{bmatrix}$$

4. Computation of the estimation error vector as indicated in equation 5.

5. Computation of the updated values at instant k of the parameters of the matrices $A_i(k)$ ($i=1, 3$) and $B_i(k)$ ($i=1, 4$), according to the equations 6, 7 and 9, taking into account that no disturbances were considered and that the value of the coefficients $\beta$ corresponding to the non-zero parameters in the top and bottom rows were set to 1 and 0.1, respectively, and the $\beta$'s corresponding to remaining zero parameters in both the rows were set equal 0.

6. The components of the desired process output vector $\underline{d}_p(k+2)$ at instant $k+2$, $d_{p1}(k+2)$ and $d_{p2}(k+2)$, related to top and bottom compositions, respectively, are computed by the following scalar equations, that are a particular case of the equation 10:

$$d_{p1}(k+2) = \sum_{i=1}^{2} f_{1i}v_1(k+2-i) + \sum_{i=1}^{2} h_{1i}v_1(k+1-i) \quad (23)$$

$$d_{p2}(k+2) = \sum_{i=1}^{2} f_{2i}v_2(k+1-i) + \sum_{i=1}^{3} h_{2i}v_2(k+1-i) \quad (24)$$

where $v_1(k+1-i)$ and $v_2(k+1-i)$ are the components related to the top and bottom compositions, respectively, of the driver block input vector $\underline{v}(k+1-i)$ at instant $k+1-i$. The parameters of equations 23 and 24 were chosen equal to those of a second order model, without and with a sampling time delay respectively, a natural frequency of 0.0056 rad/sec, a damping ratio and static gain equal to 1. Given that the value of the previously mentioned static gain is unity, the components $v_1(k+1-i)$ and $v_2(k+1-i)$ have the physical meaning of being the setpoint values for top and bottom compositions, respectively, at instant $k+1-i$.

In equation 23 the value $y_1(k+1)$ was previously computed by:

$$y_1(k+1) = y_{p1}(k+1) - y_{p1}(k-1) \quad (25)$$

Note that $y_{p1}(k+1)$ is the value of the top composition measured at instant k.

From $\underline{d}_p(k+2)$, the desired incremental process output vector $\underline{d}_1(k+2)$ is computed by:

$$\underline{d}_1(k+2) = \underline{d}_p(k+2) - \underline{y}_p(k) \quad (26)$$

The components of $\underline{d}_1(k+2)$, $d_{11}(k+2)$ and $d_{12}(k+2)$, related to the top and bottom compositions, were limited to the absolute values of 0.3 and 0.6%, respectively.

7. Computation of the control vector by:

$$\underline{u}(k) = B_1^{-1}(k)\underline{d}_1(k+2) - B_1^{-1}(k) \sum_{i=2}^{4} B_i(k)\underline{u}(k+1-i) - \quad (27)$$

$$B_1^{-1}(k) \sum_{i=1}^{3} A_i(k)\underline{y}(k+2-i)$$

$$\underline{u}_p(k) = \underline{u}(k) + \underline{u}_p(k-2) \quad (28)$$

8. The absolute and the incremental value of $\underline{u}_p(k)$ was limit checked before being applied to the process.

Figure 3:
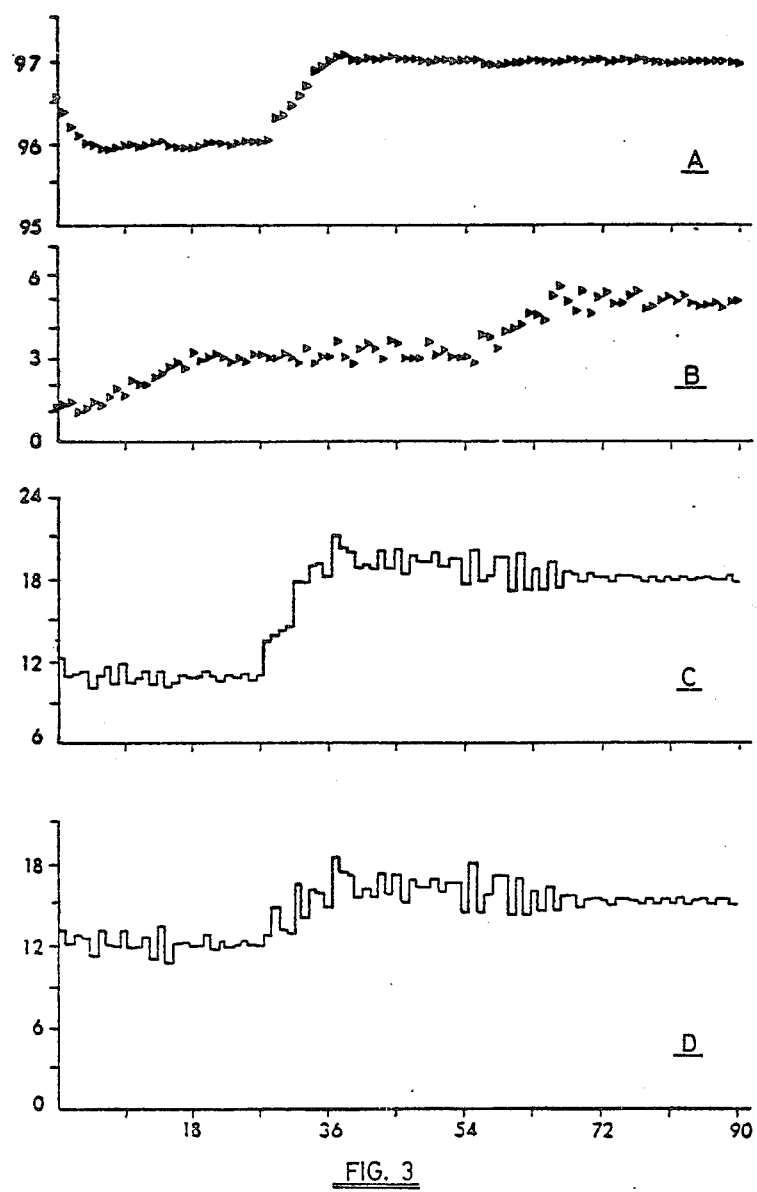
FIG. 3 shows results of one such experiment on the adaptive-predective control of a distillation column.

FIG. 3 shows, from the beginning of the control action, the results of a 6 hrs. 24 min. experiment in which the distillation column was controlled by the adaptive-predictive control system.

In FIG. 3, the diagrams A, B, C and D represent, in the Y-axis, the top composition (%), the bottom composition (%), the reflux flow rate (g/s) and the steam flow rate (g/s), respectively, and in the X-axis the time in sampling instants.

The initial values of the parameters of the adaptive-predictive model were rationally chosen, and the control system performed in its identification mode for two sampling instants before starting the control action. When the control action starts, the control system drives the process top and bottom compositions from 96.5 and 1% to 96 and 3%, respectively. Later on, at the instant 29, while the bottom composition is held at 3%, the top composition is driven to 97%, and at the instant 55, the bottom composition is driven from 3 to 5% and the top composition is held at 97%.

Note that the multivariable control problem of a binary distillation column, that the adaptive-predictive control system has solved commendably, has been for a long time an often cited example of difficulties in interacting multivariable chemical processes.

In summary, the adaptive-predictive control system described uses a digital computer to accomplish the adaptive control of single-input single-output or multivariable time-variant processes with known or unknown parameters and with or without time delays, in such a way that the dynamic output vector of the process is predicted and the control vector, to be applied to the process, is computed with the objective that the predicted dynamic output vector becomes equal to the desired dynamic process output vector.

What is claimed is:

1. A method for generating a control vector during each of a plurality of sampling instants k, said control vector to be applied to an apparatus which carries out a process having at least one input variable and at least one output variable, at least one of said input variables defining a process input vector, said apparatus varying said process input vector in accordance with the value of said control vector, said method comprising the steps of:
   (A) storing a model which is capable of predicting the dynamic value of a process output vector, which vector is composed of at least one of said process output variables, at a future sampling instant $k+r+1$ as a function of said control vector;
   (B) generating a desired dynamic process output vector at each of said sampling instants k, said desired dynamic process output vector being representative of a desired value of said process output vector at said future instant $k+r+1$; and
   (C) generating, at each of said sampling instants k, that control vector which said model predicts will cause said dynamic process output vector to be equal to said desired dynamic process output vector at said future sampling instant $k+r+1$.

2. The method of claim 1, wherein said desired dynamic process output vector is generated taking into account the desired dynamics for said process and as a function of both a desired steady state process output vector and said dynamic process output vector.

3. The method of claim 2, wherein said step of generating said desired dynamic process output vector includes the step of generating an incremental desired dynamic output vector representative of the incremental difference between the desired dynamic process output vector and said dynamic process output vector.

4. The method of claim 1 wherein said control vector is an incremental control vector representative of the incremental variation in the input vector of said process which said model predicts will cause said dynamic process output vector to be equal to said desired dynamic output vector at said future sampling instant $k+r+1$.

5. The method of claim 3 wherein said control vector is an incremental control vector representative of the incremental variation in the input vector of said process which said model predicts will cause said dynamic process output vector to be equal to said desired dynamic output vector at said future sampling instant $k+r+1$.

6. The method of claim 1, further including the step of periodically updating the parameters of said model in such a manner that the difference between the actual dynamic process output vector at sampling instant $k+r+1$ and the dynamic process output vector which said model predicted would result at sampling instant $k+r+1$ is reduced towards zero.

7. The method of claim 6, wherein said step of updating the parameters of said model comprises the steps of:
   (A) periodically generating an estimated process output vector representative of the dynamic process output vector which said model, as updated during some first predetermined prior sampling instant, estimates should have occurred at sampling instant k as a result of the generation of said control vector at said prior sampling instant $k-r-1$;
   (B) periodically generating an estimated error vector representative of the difference between said estimated process output vector at said sampling instant k and said dynamic process output vector at said sampling instant k;
   (C) periodically modifying the parameters of said model as a function of said estimated error vector.

8. The method of claim 7, further including the step of generating an incremental process output vector representative of the difference between the actual dynamic process output vector at instant k and the actual dynamic process output vector at some second prior sampling instant.

9. The method of claim 8, wherein said estimated process output vector is the value estimated by the model, as updated at said first prior sampling instant, of the incremental dynamic process output vector.

10. The method of claim 9, wherein said step of generating an estimated error vector comprises the step of determining the difference between said incremental process output vector and said estimated process output vector.

11. A control system for controlling a process having at least one input variable and at least one output variable, said control system comprising:
   driver block means responsive to a set point vector $\underline{v}(k)$ and an instantaneous process output vector $\underline{y}_p(k)$ for generating a desired incremental process output vector $\underline{d}_1(k+r+1)$ during each of a plurality of sampling intervals k, said desired incremental output vector $\underline{d}_1(k+r+1)$ corresponding to the desired incremental change in output vector of said process between the sampling interval k and the sampling interval $k+r+1$;
   control block means responsive to said desired incremental output vector $\underline{d}_1(k+r+1)$ for generating an incremental control vector $\underline{u}(k)$ during each said sampling interval k in accordance with an adaptive-predictive model, said adaptive-predictive model serving to predict the process output vector and to determine the incremental control vector $\underline{u}(k)$ which must be applied to the process during sampling interval k to make the predicted process output vector equal to the desired process output vector during sampling interval $k+r+1$ as determined by said incremental desired output vector $\underline{d}_1(k+r+1)$;
   identification block means responsive to said incremental control vector $\underline{u}(k)$ and an incremental process output vector $\underline{y}(k)$ for generating an estimated incremental process output vector $\underline{d}(k)$ during each said sampling interval k in accordance with said adaptive-predictive model said estimated incremental process output vector $\underline{d}(k)$ being representative of the incremental process output which the adaptive-predictive model, as updated during a sampling interval prior to sampling interval k, predicts should occur during interval k as a result of the generation of the incremental control vector $\underline{u}(k-r-1)$ during sampling interval $k-r-1$;
   means for generating an estimated error vector $\underline{e}(k)$ during each of said sampling intervals k, said estimated error vector $\underline{e}(k)$ being representative of the difference between said estimated incremental process output vector $\underline{d}(k)$ and said incremental output vector $\underline{y}(k)$; and feedback means responsive to said estimated error vector e(k) for modifying the parameters of said adaptive predictive model during each said sampling interval k, said feedback means to modify the parameters of said adaptive-predictive model in such a manner that said estimated error vector e(k) is reduced towards zero.

12. The method of claim 1 further including the step of applying said control vector to said apparatus in a manner which will cause said apparatus to vary said process input vector in accordance therewith.

* * * * *